2,126,195

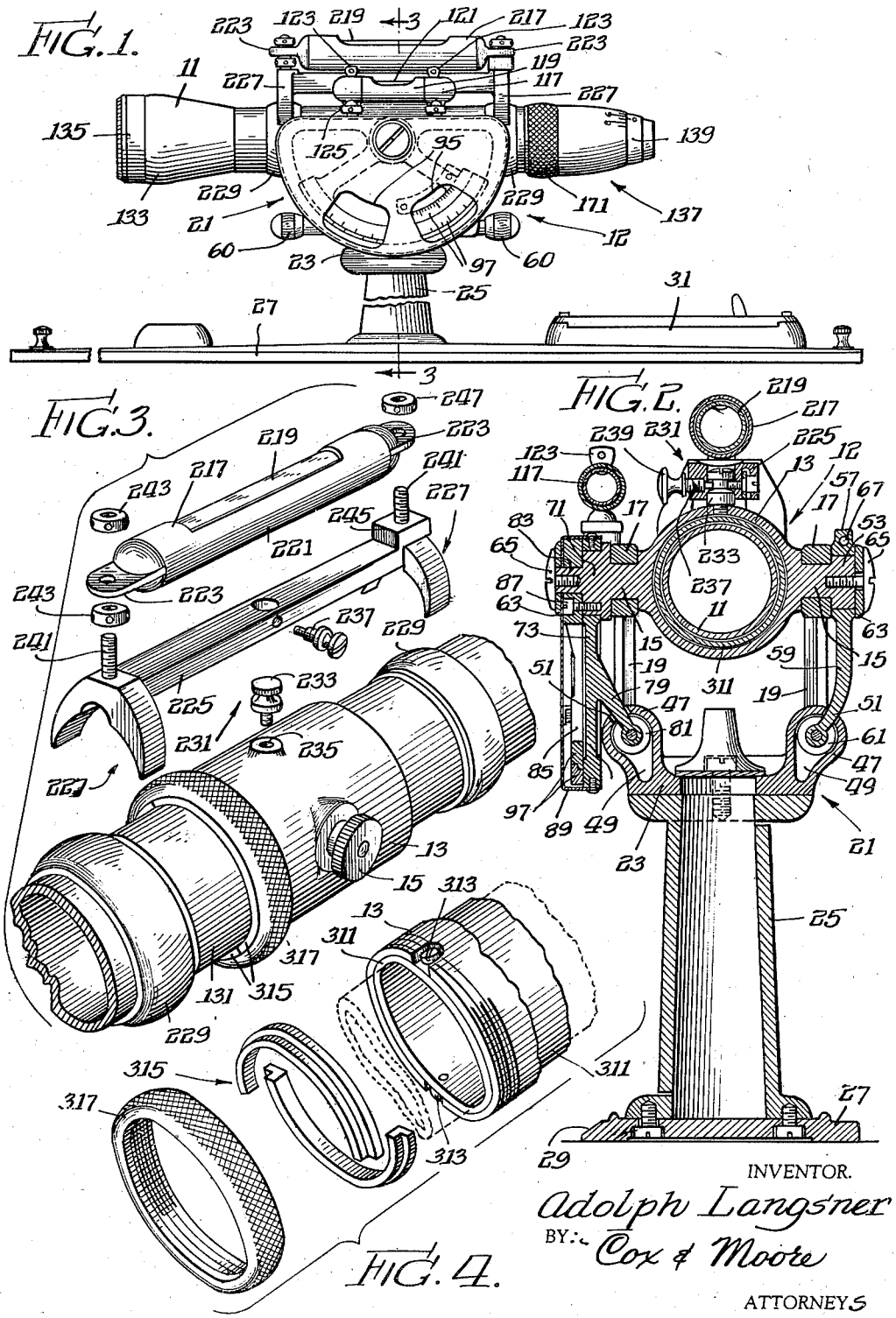
Aug. 9, 1938. A. LANGSNER 2,126,195
SIGHTING DEVICE AND SUPPORT FOR SAME
Original Filed March 16, 1935
INVENTOR.
Adolph Langsner
BY Cox & Moore
ATTORNEYS Patented Aug. 9, 1938

UNITED STATES PATENT OFFICE 2,126,195

SIGHTING DEVICE AND SUPPORT FOR SAME

Adolph Langsner, Chicago, Ill., assignor to Eugene Dietzgen Co., Chicago, Ill., a corporation of Delaware Original application March 16, 1935, Serial No. 11,525. Divided and this application January 31, 1938, Serial No. 187,996

7 Claims. (Cl. 33—67)

My invention relates in general to measuring instruments and has more particular reference to alidades and similar precision instruments for use in surveying, the same comprising subject-matter divided from my copending application, Serial No. 11,525, filed March 16, 1935.

An important object is to provide an adjustable support for a telescope or other sighting device having simplified construction and a minimum number of operating parts while, at the same time the parts are configured in order to enhance the attractive appearance of the instrument, the parts being formed to facilitate assembly thereof.

Another important object is to provide clamp means for facilitating the mounting of a telescope or other tubular member within a support sleeve, while the portion of the tubular element mounted in the sleeve lies intermediate or between portions of larger diameter.

Another important object is to provide a mounting embodying a split ring for mounting a telescope or other tubular device in a sleeve-like support where the telescope has enlarged portions of a size normally hindering the mounting of the same in the sleeve-like support.

Another important object resides in providing a telescope having annular means on the barrel thereof forming spaced seats for the mounting of an attachment; a further object being to provide an improved saddle for the support of the attachment, including means to secure the saddle on the telescope with its feet resting on the annular seat-forming means; a still further object being to removably support the telescope in an annular mounting which receives the telescope intermediate the annular seat-forming portions and to secure the attachment-carrying saddle on the telescope supporting sleeve.

Another important object resides in providing means for detachably mounting in a sleeve-like support portions of a telescope extending intermediate enlarged annular seat-forming portions of the character mentioned, whereby the instrument may be readily mounted in its support and at the same time provide for the mounting on the supported instrument of an attachment in position straddling the telescope mounting.

Another important object is to provide means for removably mounting a telescope in a pivoted support for movement about an axis at right-angles with respect to the longitudinal axis of the telescope, and at the same time to provide for mounting an attachment, such as a spirit level, closely adjacent the tilting axis of the telescope mount.

Among the other important objects is to provide improved means for demountably supporting a sighting device, such as a telescope, in a sleeve-like frame providing a tilting axle; to provide a support standard of improved construction facilitating assembly and providing a more attractive instrument at reduced cost; to provide for mounting an attachment closely adjacent the tilting axis of a tiltable surveying instrument.

Numerous other objects and advantages of the invention will be apparent from the following description, which, taken in connection with the accompanying drawing, discloses preferred embodiments of my invention.

Referring to the drawing:

Figure 1 is a side elevation of an instrument embodying the features of my present invention;

Figure 2 is an enlarged sectional view taken substantially along the line 2—2 in Figure 1;

Figure 3 is an exploded view of parts of the mounting; and

Figure 4 is an additional exploded view of some of the parts shown in Figure 3.

To illustrate my invention, I have shown, on the drawing, a measuring instrument comprising a sighting device 11 and support means 12 for tiltingly carrying the sighting device in operative position. The assembly also includes manually operable devices carried on the support for adjusting the angularity of the sighting device, and means for determining a variety of data dependent upon the tilted position of the telescope on the support.

The instrument, which I have illustrated, comprises an alidade, although it is obvious that many features of the present invention are not necessarily restricted to this particular type of surveying instrument. The sighting device 11 preferably comprises a telescope supported in a sleeve-like frame 13 having projecting axles 15 carried in bearings 17 formed in spaced upstanding arms 19 of a support frame 21. The frame 21 has a base 23 mounted on a pedestal 25 which in turn is supported on a base 27 comprising an elongated strip, at least one edge of which is formed as a straight edge 29, the parts being arranged so that the longitudinal axis of the telescope lies at all times in the medial plane of the assembly and parallel with the straight edge 29. The frame 13 and axles 15 provide for the tilting of the telescope about an axis at right angles to the plane in which the axis of the telescope extends. The base 27 also carries a compass comprising a case 31.

The lower ends of the arms are connected to the base of the frame 21 in spaced relationship and walls 47 are formed extending between the lower portions of said arms and forming with said arms and the base of the frame an enclosed chamber 49 containing an elongated slot 51. One of the axles 15 of the frame 13 projects outwardly of its bearing and is formed with a head 53 adapted to receive a clamping element comprising a split collar 57 embracing the head 53 and an arm 59 extending radially of said split collar and having an end extending through the slot 51 and into one of the chambers 49, the end of the arm within the chamber being formed with a disk 61. The split collar 57 is held on the head 53 in any suitable fashion as by means of the washer 63 and the holding screw 65. Clamp means 67, comprising a threaded shaft interconnecting the split portions of the collar 57 and a manually operable head for tightening and loosening the screw, is provided for clamping the collar 57 on the head 53 so that the arm 59 may be made fast with the axle 15.

The other axle of the frame projects outwardly of the bearing in which it is journalled and is formed to provide a head having a portion 71, on which is journalled a spider-like element 73 of semicircular cross-sectional configuration and having a central arm having a projecting arm 79 extending through a slot 51 into one of the chambers 49, the end of said projecting arm 79 being formed as a disk 81 similar to the disk-like end 61 of the clamp arm 59. The arms 59 and 79 extend in different chambers 49 on opposite sides of the instrument.

The axle portion 71 has an extension 83 carrying a segmental spider 85, which extends adjacent and in front of the spider 73. The segmental spider 85 is secured to and made fast in any suitable fashion, as by the fastening studs 87, to the axle. The spider 85 consequently is fast with the frame 13 and will turn with the telescope or sighting device. The spider 73, however, is loose on the axle portion 71 and may consequently be held stationary with respect to the support pedestal, by means of the arm 79. The telescope may be rotated freely by hand by loosening the clamp means 67 in order to release the split collar 57. After the telescope has been sighted in a rough way, the clamp means 67 may be tightened to clamp the arm 59 to the telescope so that further accurate adjustment of the telescope may be accomplished through said arm. In order to accurately level the telescope in sighting the same, the pedestal is provided with tangent screw adjusting means 60 in position to cooperate with the ends of the arms 59 and 79 within the chambers 49, there being separate adjusting means for each arm.

The tangent adjusting means 60 are preferably of like construction and may be formed and arranged as described and shown in my copending application, Serial No. 11,525, filed March 16, 1935, of which the present application is a division.

The assembly is particularly attractive and neat in appearance, all operating parts being substantially enclosed not only to prevent access thereto of foreign matter but also to prevent damage to the threads of the stem and to the backing pin by accidental impact upon these parts.

A preferably sheet metal cover 89 is secured on the spider 73, said cover enclosing the outwardly facing surface of the spider 73 and the spider 85 is enclosed between the spider 73 and the cover 89. The cover 89 is formed with openings 95 in position to reveal portions of the circular edges of both spiders which are formed with scale-carrying surfaces 97 visible through the openings 95.

It will be seen that the spider 85, since it is fastened on the frame 13 will tilt with the telescope while the spider 73, which is journalled on the axle of the flange may be held in adjusted position with respect to the support by means of the arm 79. The surfaces of the spiders exposed through the openings 95 may be formed with suitable scales for indicating the angularity of the telescope and the vertical and horizontal components of the angularity expressed in suitable terms, as, for instance, in horizontal and vertical stadia distance constants, which may be determined directly by reading the scales when the telescope is in adjusted position. To this end the scales may be arranged in the manner shown in my copending application, Serial No. 11,525, filed March 16, 1935, of which the present application is a division.

The spider 73 carries a spirit level 117 mounted thereon preferably along its upwardly facing substantially flat edge in order to permit the spider 73 to be accurately adjusted on the support pedestal by means of its tangent adjusting screws in conditioning the instrument for use in a particular location. It will be understood that the plane table, on which the instrument is mounted for use, may not be exactly level, for which reason it is necessary to level the spider 73 before sighting the telescope and making the stadia readings on the scales.

The spirit level 117 may be of any suitable or convenient form or construction and preferably comprises a housing 119 containing a vial 121 therein and support means comprising headed stems 123, which penetrate the opposed ends of the vial housing 119 and are threaded at their lower end into the top of the spider 73. Clamping nuts 125 are or may be provided on the stems 123 to secure the parts in mounted relationship. By screwing the stems 123 to a proper distance in the frame 73, it is possible to adjust the vial in proper alignment on the spider, and I prefer to utilize a vial, housing, and adjustable mounting substantially as shown in my copending application, Serial Number 751,241, filed November 2, 1934.

The telescope or sighting device 11 comprises a tubular, preferably cylindrical barrel 131, which is or may be provided with a belled extension 133 at one end to receive an objective lens assembly 135. At its opposite end, the telescope barrel may also be provided with an eye-piece assembly 137 including an eye-piece focusing device 139 and, within the barrel, the usual adjustable reticle (not shown) may be provided. The usual objective focusing slide may also be arranged within the barrel between the eye-piece and objective lens assemblies. The objective slide carries a suitable lens assembly fitted therein and is slidable longitudinally within the barrel for the purpose of focusing the telescope. Means comprising the knurled collar 171 is operable outwardly of the barrel of the telescope for adjusting the position of the slide within the barrel.

The telescope or sighting device also preferably carries a spirit level 217 detachably mounted thereon to facilitate leveling of the telescope in the alidade. To this end, the level comprises a spirit vial 219 enclosed within a casing 221, the opposed ends of which are formed with lugs 223, whereby the same may be mounted on the telescope. The vial mounting comprises a frame 255 having spaced pairs of legs 227, each pair of legs being adapted to straddle upon a seat 229 comprising an annular ring mounted on the barrel of the telescope. The rings 229 are spaced on the telescope barrel in position to receive the pairs of legs 227 at opposite ends of the frame 225. The frame 225 is secured in mounted position on the telescope by means of a fastening device 231 comprising a necked projection 233 mounted on and projecting upwardly of the annular portion of the telescope support frame 13. The frame 225 is provided with a socket 235 in position to receive the projection 233, and the frame 225 carries a holding pin 237 threaded therein and having an inner end adapted to engage the necked portion of the projection 233 in order to fasten the frame on the projection. The holding pin 237 at its outer end is provided with a manually operable head 239 by which the same may be manipulated either to fasten or release the frame on the projection 233. The frame 225 at its opposite ends is formed with preferably threaded uprights 241 spaced to receive the perorated lugs 223, which are adjustably mounted thereon by means of the threaded clamping nuts 243, there being a pair of nuts 243 on one of the threaded bushings 241 at one end of the vial and at opposite sides of the lugs 223 whereby said lug and the end of the housing may be clamped by and between said nuts at a desired elevation on the post 241. A similar arrangement may be utilized at the opposite end of the vial although this is not necessary, and I have shown a permanent support portion 245 formed on the frame 225 and upon which the lug 223 in said end of the vial housing may be firmly clamped by means of a nut 247 similar to the nuts 243.

The telescope is mounted in the sleeve 13 of the tilting frame, which embraces the telescope about its mid-portion substantially between the seats 229. The tilting frame may, of course, be assembled on the telescope before the saddles 229, the eye-piece, and the adjusting element 171 are assembled, in which case, it is simply necessary to slide the telescope into the annular portion 13 and shrink the same upon the barrel. With such an arrangement, however, it is impossible to remove the telescope from its mounting without disassembling the telescope.

I have provided an improved mounting whereby the telescope may be removed from the frame 13 or assembled therein. The improved mounting comprises a tapered sleeve 311 adapted to be fitted onto the telescope. The external surfaces of the sleeve 311 and the internal surfaces of the sleeve 13 are correspondingly tapered. The sleeve 13 is sufficiently large to permit the eye-piece end of the telescope to be inserted and passed completely through the sleeve 13.

The sleeve 311 is mounted on the telescope between the saddles 229 and is snugly fitted into the sleeve 13. Set screws 313 are positioned at the larger end of the tapered sleeve 311 and fit into notches formed in the end of the sleeve 13 to prevent the sleeve 311 and the telescope from turning in the sleeve 13. In order to retain the sleeves 311 and 13 in mounted position, a preferably split ring 315 is provided, which abuts the ends of both sleeves 311 and 13. It is desirable that this ring be split in order to enable its assembly without requiring that the same be placed over the end of the telescope. A clamp ring 317 is also provided. The rings 315 and 317 have interlocking flanged portions and the ring 317 is adapted to be screwed upon the end of the sleeve 13 in position to hold the split ring 315 together and in position preventing outward movement of the sleeve 311 from the sleeve 13. The clamp 317 also preferably covers the heads of the screws 313 and prevents them from becoming loosened. It will be noted that the ring 317 is large enough to permit the telescope, including the seats 229, to be inserted endwise therethrough. While I prefer to apply the sleeve 311 as an integral element, it is, of course, and within the contemplation of my present invention to form this part also as a split element to permit the same to be assembled on the telescope after the same is completely assembled and without requiring that the sleeve be passed over the enlarged portion 171 at the eye-piece end of the telescope, and over the seats 229.

The construction just described permits the telescope to be quickly and easily dismounted from position in the support sleeve or to be as readily assembled in said sleeve. The construction, therefore, permits substitutions of various telescopes in the mounting, and provides also for the readily removable mounting of the spirit level 217 or other attachment on the mounted telescope adjacent the tilting axis of the telescope, with the mid-portion of the attachment in the plane of the tilting axis at right-angles to the longitudinal axis of the telescope.

It is thought that the invention and numerous of its attendant advantages will be understood from the foregoing description, and it is obvious that numerous changes may be made in the form, construction, and arrangement of the several parts of the illustrated apparatus without departing from the spirit or scope of my invention or sacrificing any of its attendant advantages, the forms herein described being merely for the purpose of illustrating the invention.

The invention is hereby claimed as follows:

1. A telescope comprising a tubular barrel having enlarged portions and an intermediate restricted portion, a sleeve, and means to mount the telescope in said sleeve at the restricted portion, said sleeve being sufficiently large to permit an enlarged portion of the telescope to pass through the sleeve, and said mounting means comprising a bushing on the telescope at its restricted portion and adapted to snugly fit the sleeve, retaining means adapted for application on the barrel of the telescope without passing over the enlarged portions of the telescope, said retaining means serving to hold the bushing in said sleeve, and clamp means adapted for attachment on the sleeve for retaining the holding means in operative position.

2. A telescope as set forth in claim 1, wherein said enlarged portions form spaced seats for mounting an attachment on said telescope, and means for securing the attachment on said sleeve.

3. A telescope comprising a barrel, a sleeve adapted to embrace the barrel, and means for mounting an attachment having spaced bearing portions adapted to be supported by the barrel on opposite sides of said sleeve comprising a latch member on the sleeve in position to engage a cooperating latch member on the attachment and secure the same in position with its bearing portions supported by the barrel on opposite sides of said sleeve.

4. A mounting for securing a leveling vial on a telescope, comprising a frame having spaced legs formed to seat upon the barrel of the telescope, means to secure the vial on said frame, and fastening means on said frame for securing the same to the barrel of the telescope at a point remote from the seating position of said spaced legs.

5. A mounting as set forth in claim 4, wherein said fastening means comprises a manually operable latch element formed to detachably engage a keeper carried on the barrel of the telescope.

6. A mounting as set forth in claim 4, wherein said frame is provided with a pair of spaced stems for receiving perforated ears on said vial, means to secure one of said ears on one of said stems, and means adjustable on the other stem for securing another of said ears at a desired elevation on the stem.

7. A telescope comprising a cylindrical barrel, a telescope support comprising an annular sleeve adapted to embrace the barrel, bushing means on said barrel and adapted to fit said annular sleeve, a split ring for retaining the bushing in said sleeve, and an annular clamp for said split ring to hold the same together.

ADOLPH LANGSNER.